United States Patent [19]

Matsuhisa

[11] Patent Number: 4,484,485
[45] Date of Patent: Nov. 27, 1984

[54] CARRIAGE DRIVE MEANS USING CABLES OR THE LIKE

[75] Inventor: Koh Matsuhisa, Yokohama, Japan

[73] Assignee: Ricoh Company, Ltd., Japan

[21] Appl. No.: 310,292

[22] Filed: Oct. 9, 1981

[30] Foreign Application Priority Data

Oct. 20, 1980 [JP] Japan .................. 55-145620

[51] Int. Cl.³ .................. F16H 29/02; F16H 7/14; B41J 19/30
[52] U.S. Cl. .................. 74/89.22; 400/322; 474/117; 474/135; 474/138
[58] Field of Search .................. 74/89.2, 89.21, 89.22; 474/113, 117, 116, 115, 133, 136, 138; 400/322, 320

[56] References Cited

U.S. PATENT DOCUMENTS

| | | | |
|---|---|---|---|
| 2,612,988 | 10/1952 | Andrews | 474/138 |
| 3,285,085 | 11/1966 | Graham | 474/138 |
| 3,631,734 | 1/1972 | Wagner | 474/117 |
| 3,642,109 | 2/1972 | Cappotto et al. | 474/117 |
| 4,060,149 | 11/1977 | Henley | 74/89.2 |
| 4,116,568 | 9/1978 | Suzuki et al. | 400/322 |
| 4,298,342 | 11/1981 | Clayton et al. | 474/110 |

FOREIGN PATENT DOCUMENTS 96110 6/1939 Sweden .................. 474/115

Primary Examiner—John E. Murtagh
Assistant Examiner—Andrew Joseph Rudy
Attorney, Agent, or Firm—Guy W. Shoup; Gerard F. Dunne

[57] ABSTRACT

Carriage drive means having cables or belts for transmitting drive force and a spring for tensioning the cables or the belts. A rigid member interposed between the spring and the cable or belt, the rigid member constituting a self-locking mechanism which allows the member to move, when elongation occurs in the cable or belt, to a position in which the elongation is absorbed by the tension of the spring, but does not allow same to move in a direction in which it is restored to its original position.

In the aforesaid self-locking mechanism, the rigid member may be in the form of a segmental cam which engages with suitable friction the shaft of a pulley mounted for movement while having the cable wound thereon, or the rigid member may engage with suitable friction a pivotal member for supporting in a position remote from the pivot the pulley having the cable wound thereon.

6 Claims, 5 Drawing Figures

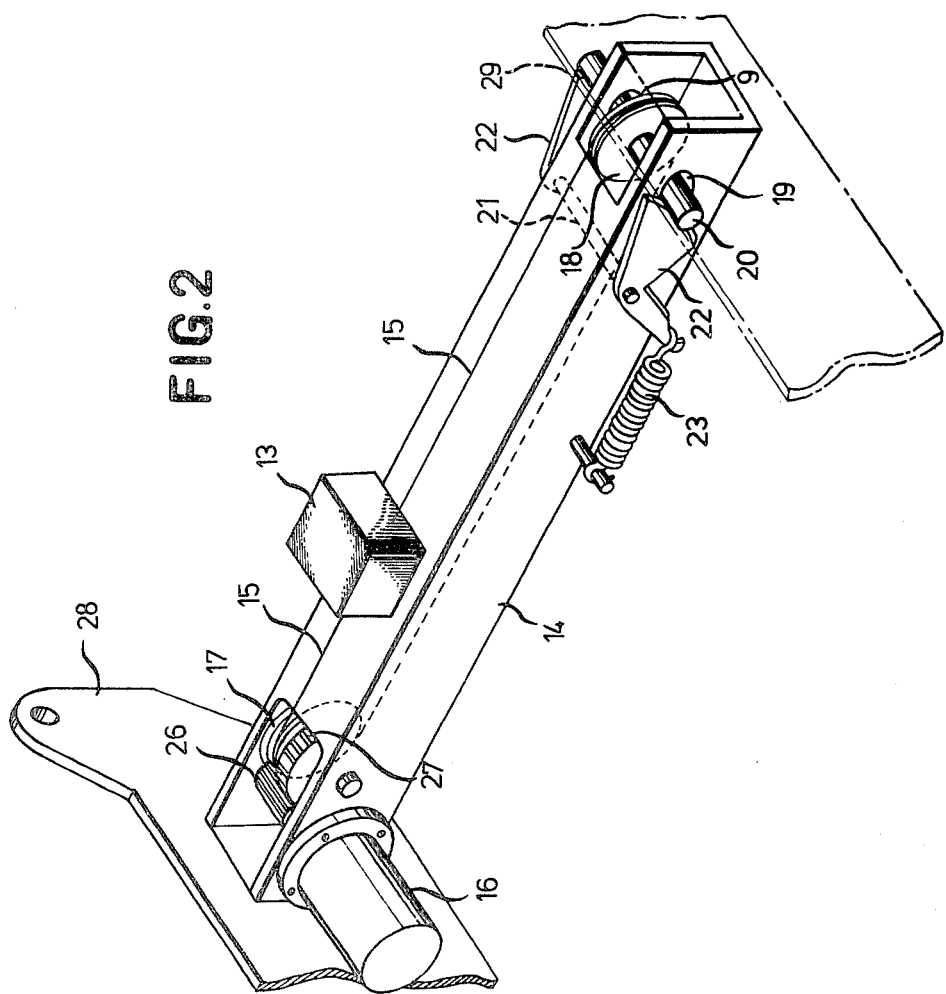

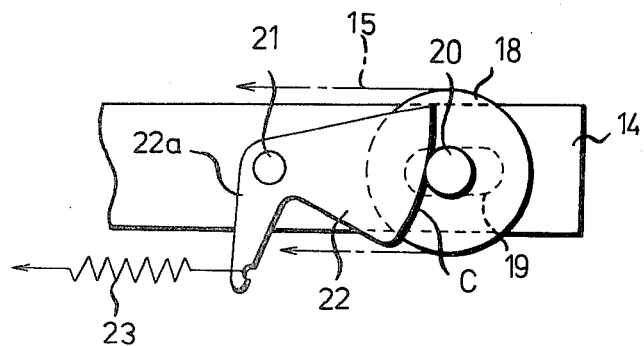
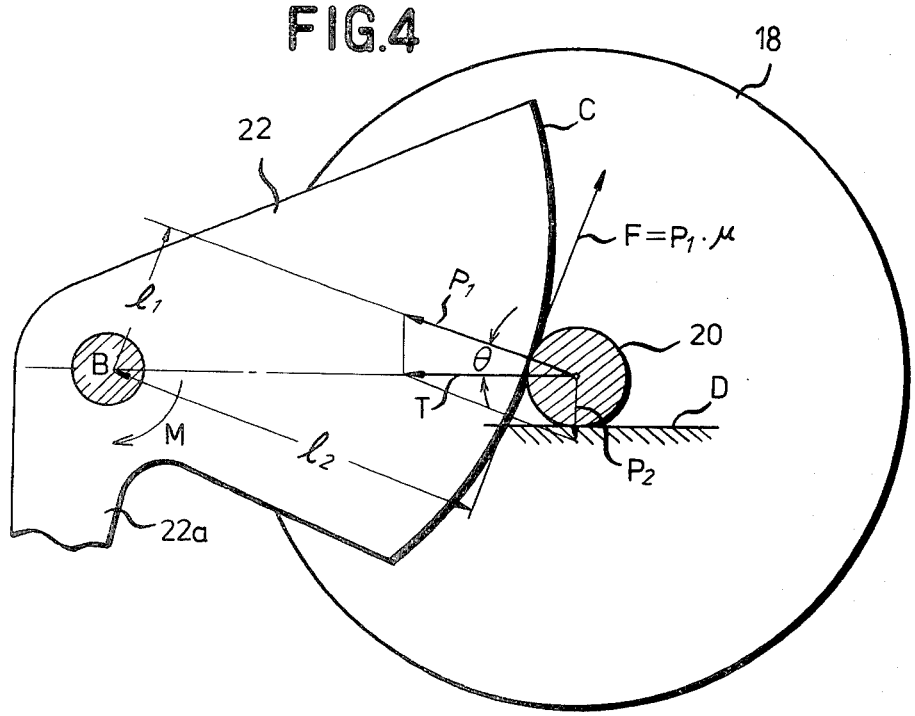

CARRIAGE DRIVE MEANS USING CABLES OR THE LIKE

BACKGROUND OF THE INVENTION

This invention relates to drive means in which cables or belts are used for transmitting drive force.

In motive force transmitting means that require a feed of high speed and high accuracy to be effected as in carriage drive means of a printer, for example, a drive force transmitting system using cables or belts and pulleys is widely used because it has the advantages of being simple in construction, low in inertial force and high in durability. The cable or belt used in this type of means is trained over pulleys with tension at all times to ensure that the carriate is driven and stops in positions which are the same throughout the operation. Moreover, during carriage drive operation, repeated stress is applied to the cables or belts and elongation thereof may be caused to occur as time passes. If this tendency is allowed to take place without any check, the cables or belts may be loosened and it will become impossible for the carriage to stop in predetermined positions without fail, causing a deterioration in the quality of the printed characters. Thus it is necessary to correct the elongation of the drive cables or belts that might occur with time.

FIG. 1 shows one type of carriage drive means of the prior art of a printer operative to tension the drive cable and provided with means for correcting elongation of the cable that might occur with time, in which a drive motor 1 has secured to its output shaft a drive pulley 2, a carriage 9 movable in a predetermined path along a guide, not shown, guide pulleys 5, 6, 7 and 8, and drive cables 3 and 4, the drive cable 3 being wound on the drive pulley 2 and connected to the carriage 8 while being trained over the guide pulleys 5 and 6 while the drive cable 4 is wound on the drive pulley 2 and connected to the carriage 9 while being provided over the guide pulleys 7 and 8, to provide a loop connecting the carriage 9 to the output shaft of the motor 1. The pulleys 7 and 8 are mounted on a tensioning arm 11 pivoted on a fixed pin 10 located near the pulley 7, and a tensioning spring 12 is mounted between one end of the tensioning arm 11 and a machine frame to urge the pulley 8 to move outwardly at all times. By this arrangement, the cables 3 and 4 are tensioned as predetermined at all times and elongation of the wires that might occur with time can be corrected.

The tensioning mechanism shown in FIG. 1 is not without disadvantages. If the tensioning spring 12 has a low tension, the vibration system consisting of the carriage 9, cables 3 and 4 and spring 12 would be low in natural frequency and large in amplitude with prolongation of vibration damping time. Thus it would take a long time before vibration is damped to an allowable amplitude level, adversely affecting the printing speed. If the printing speed is set at a high level, printing would be carried out before the amplitude is sufficiently damped, so that alignment of the printed characters would be unobtainable and the quality of the printed characters would be deteriorated.

On the other hand, if the tensioning spring has a high tension, the aforesaid disadvantages could be obviated. However, it would become necessary to increase the rigidity of the frame structure. This would not only increase costs but also shorten the lives of the pulleys, pulley bearings and cables. A friction load applied to the drive motor would be increased, and variations that occur with time would increase, thereby causing changes to occur in vibration characteristics. Moreover, when the tension of the spring is increased, the resilience of the frame with respect to the spring constant could not be neglected. Thus it is impossible to increase the spring constant to all intents and purposes.

SUMMARY OF THE INVENTION

This invention has as its object the provision of carriage drive means using cables or the like obviating the aforesaid disadvantages of the prior art which is capable of increasing the spring constant of the drive system even if the tension of the cables is low and positively correcting elongation of the drive cables or belts that might occur with time.

According to the invention, the aforesaid object can be accomplished by tensioning means comprising a rigid member interposed between a spring for tensioning a cable or belt and the cable or belt, the rigid member constituting a self-locking mechanism which allows the member to move, when elongation occurs in the cable or belt, to a position in which the elongation is absorbed by the tension of the spring, but does not allow same to move in a direction in which it is restored to its original position.

In the aforesaid self-locking mechanism, the rigid member may be in the form of a segmental cam which engages with suitable friction the shaft of a pulley mounted for movement while having the cable wound thereon, or the rigid member may engage with suitable friction a pivotal member for supporting in a position remote from the pivot the pulley having the cable wound thereon.

BRIEF DESCRIPTION OF THE DRAWINGS

Additional objects and advantages of the invention will become apparent to those skilled in the art as the description proceeds with reference to the accompanying drawings wherein:

FIG. 2 is a perspective view of the carriage drive means using cables and the like comprising one embodiment of the invention;

FIG. 3 is a front view of the essential portions of the tensioning means shown in FIG. 2;

FIG. 4 is a schematic view in explanation of the operation of the tensioning means shown in FIG. 2.

DESCRIPTION OF THE PREFERRED EMBODIMENTS

Figure 1:
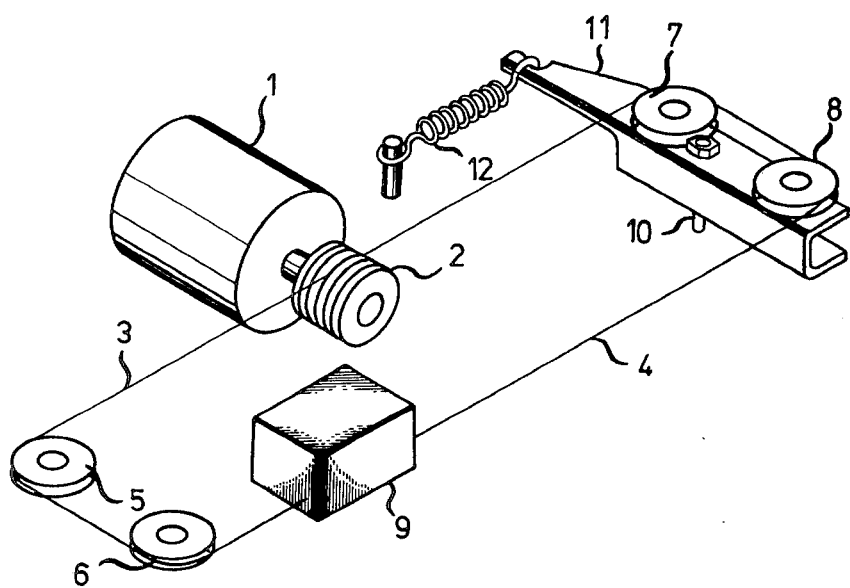
FIG. 1 is a perspective view of a cable drive device of the prior art.

FIG. 2 shows an embodiment of the invention incorporated in a carriage drive means of a printer. It is to be understood that the embodiment is shown and described for illustrative purpose only and that the invention is not limited to this specific use of its embodiment. As shown, a carriage 13 is movable on a stay 14 in the form of a box beam along guide means, not shown, secured to the stay 14 in predetermined directions. A drive cable 15 secured at opposite ends to the carriage 13 is trained over a drive pulley 17 and a guide pulley 18. The drive pulley 17 is driven by a drive motor 16 fixed on the one end portion of the stay 14 through a pinion gear 26 fixed on the shaft of the motor 16 and a pulley gear 28 fixed on the shaft of the drive pulley 17, engaging with each other. The shaft of the drive pulley 17 is rotatably supported at the end portion of the stay 14 neighboring to the drive motor 16. As shown in detail in FIG. 3, the guide pulley 18 is rotatably supported on a pin or cam shaft 20 inserted in slots 19 formed in a lengthwise direction near one end of the stay 14 in such a manner that the pin 20 is permitted movement longitudinally within the slot but against rotation. Supported by the stay 14 at its opposite sides and disposed parallel to the pin 20 is another pin 21 having secured to opposite ends thereof segmental cams 22 of the identical shape and the same posture. One of the segmental cams 22 has a tensioning spring 23 mounted between a pin secured to the stay 14 and the forward end of an arm 22a extending from a pivot B substantially at a right angle to the center line of a segment having a cam surface C. By the tension of the spring 23 being substantially parallel to the stay 14, the cam 22 is urged to move clockwise about the pivot 21, and the cam surface C having the distance from the center increasing upwardly along the cam surface C is pressed by the pin 20 supporting the pulley 18. Thus the pulley 18 is pressed outwardly and the cams 22 are maintained in a position in which the tension of the cable 15 and a component of force of the cam surface C pressing the pin 20 in the direction of the cable 15 balance.

When elongation of the cable 15 with time occurs and its tension is reduced, the cam 22 angularly rotates clockwise about the pin 21 due to the tension of the spring 23, to press the pulley 18 further outwardly, to thereby correct the elongation of the cable 15 occurring with time and keep the tension of the cable 15 constant at all times.

A frictional force proportional to the pressing force acts between the cam surface C of the cam 22 and the pin 20, so that the aforesaid displacement of the cam 22 takes place when the difference between the tension of the cable 15 and a component of the pressing force of the cam 22 in the direction of the cable 15 rises above a predetermined level. Also the pin 20 does not cause the cam 22 to rotate by the tension of the cable 15, thereby constituting a self-locking mechanism.

The conditions of the aforesaid self-locking mechanism will be described by referring to FIG. 4. In FIG. 4, the following relation holds:

$$P_1 = T/\cos\theta$$

$$F = P_1 \cdot \mu = T \cdot \mu/\cos\theta$$

where

T: Force in the direction of cable 15 exerted on pin 20.
$P_1$: Pressing force acting between pin 20 and cam surface C.
$P_2$: Pressing force acting between pin 20 and guide surface D.
$\mu$: Coefficient of friction between pin 20 and cam surface C.
F: Frictional force between pin 20 and cam surface C.
$\theta$: Angle formed by the forces $P_1$ and T.

A moment M at which the cam 22 is rotated about the center B of the pin 21 by the spring 23 matches the sum of a moment $m_1$ by $P_1$ about point B and moment $m_2$ by F.

Therefore, $M = m_1 + m_2 = P_1 l_1 + F l_2$ $$= T l_1/\cos\theta + T \mu l_2/\cos\theta$$

$$= \frac{T}{\cos\theta}(l_1 + \mu l_2)$$

Thus, $T = \frac{M \cos\theta}{(l_1 + \mu l_2)}$ (a)

In equation (a), $\mu$ has a value between zero and the maximum stationary friction, and the value of T fluctuated in the range of:

$$T_{min} = M \cos\theta/(l_1 + \mu l_2)$$

$$T_{max} = M \cos\theta/l_1.$$

When the force of rotation for the cam 22 by the force T of the rod 20 is considered, $m_1 + m_2$ has an unlike sign and can be expressed as follows:

$$m_1 + m_2 = \frac{T}{\cos\theta}(l_1 - \mu l_2)$$

$\mu$ has a value ranging from zero to the maximum stationary frictional coefficient, and the value in the parentheses of the above equation is 0 at all times so long as the condition is stationary, so that no force of rotation acts, and the force of rotation acts only when $l_1 - \mu l_2 > 0$.

Stated differently, $$l_1 \leq \mu l_2$$

$$l_1/l_2 = \tan\theta \leq \mu$$

That is, if $\theta$ is set at a value lower than the maximum stationary friction angle, the force of rotation by T will not act even if M=0, so that it will be possible to design a carriage drive system of high rigidity with minimized T.

It $\tan\theta = \mu$, the following relation will hold:

$$T_{min} = M \cos\theta/2l_1$$

$$T_{max} = M \cos\theta/l_1.$$

Figure 5:
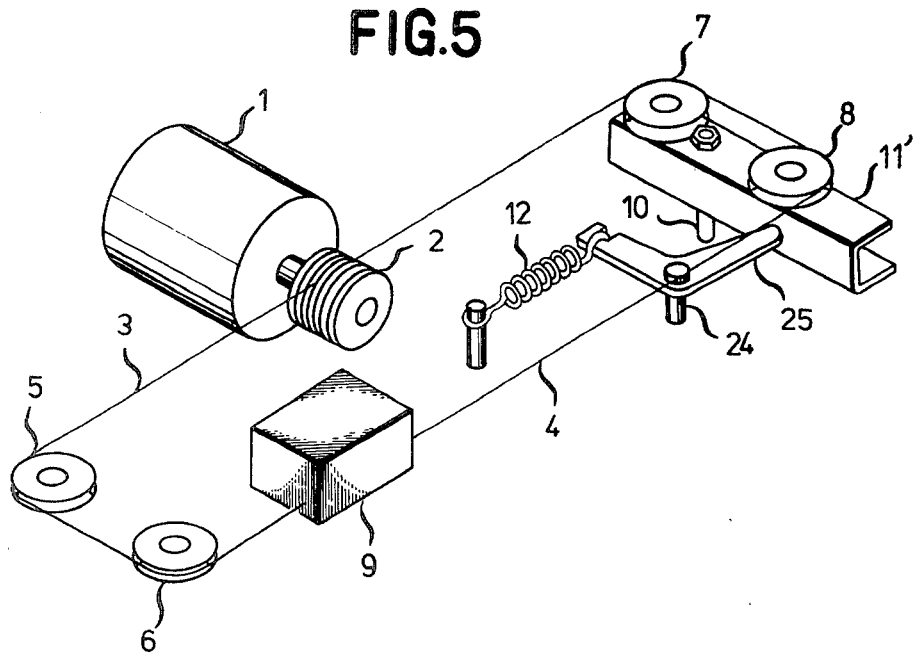
FIG. 5 is a perspective view of the tensioning means comprising another embodiment of the invention.

FIG. 5 shows an embodiment of the invention incorporated in a carriage drive means of a printer of the prior art, described previously by referring to FIG. 1. The tensioning spring 12 directly connected to one of the tensioning arm 11 as shown in FIG. 1 is connected to one end of an L-shaped lever 25 supported by a pin 24 secured to a machine frame and urged to move in pivotal movement counterclockwise in FIG. 5, to cause the other end of the lever 25 to press against one side of the tensioning arm 11'. By this arrangement, the pulley 8 is moved outwardly to tension the cables 3 and 4, and when elongation of the cables 3 and 4 occurs with time, the lever 25 is moved counterclockwise in pivotal movement by the tension of the spring 12, to push out the tensioning arm 11' and correct the elongation. In this case, self-locking is accomplished by the friction between the contact surfaces of the arm 11' and the lever 25.

Besides the two embodiments shown and described hereinabove, a screw, a nut and a torsion spring may be used to constitute a self-locking mechanism, and other known mechanisms may be utilized for incorporating the present invention therein.

From the foregoing description, it will be appreciated that according to the invention, the drive cable can be tensioned by a spring through a rigid member constituting a self-locking mechanism, to correct the elongation of the cable that occurs with time and at the same time to eliminate the influences that might otherwise be exerted on the spring constant of the spring on the vibration of the carriage drive system by the self-locking action. Thus a vibration system is provided in which only the cable of high spring constant serves as a spring system, so that when this system is incorporated in the carriage drive means of a printer, it is possible to greatly reduce the vibration of the carriage and achieve marked effects in improving the quality of the printed characters and increase the speed at which the characters are printed.

By the way, referring to the drive means using cables or the like, when the drive motor starts and stops remarkable tension acts on the cables or the like by means of inertia of the carriage. Therefore, in case the rigidity of the structure supporting the pulleys winding the cables is insufficient, vibration arises on the structure, and the hunting which arises on the stop of the carriage does not converge rapidly, which is maleficent to the quality of the printed characters and the accuracy of the correct operation of the aforesaid tensioning means for cables or the like.

However, in the embodiment illustrated in FIG. 2, this problem comes to a solution by means that the pulleys winding the cables at both sides and the tensioning means are all supported on one and the same stay formed as a box beam having a large axial compressive rigidity.

Moreover, the drive motor 16 and the drive pulley 17 are supported on the one and the same end portion of the stay 14, so that pinion gear 16a and pulley gear 17a fixed on the shafts of the drive motor 16 and the drive pulley 17 respectively are able to take their accurate relative places to each other, which can spare the adjustment of backlash between the pinion gear 16a and the pulley gear 17a.

Furthermore, when the stay 14 is fixed on both ends to side plates 28, 29 of the machine frame by means of welding etc., as illustrated in FIG. 2, the stay 14 becomes a so-called "both ends fixed beam", the rigidity thereof increases, and also installation of the drive means to the apparatus is accomplished more easily.

What is claimed is:

1. Drive means for transmitting a drive force generated by a motor through an elongate drive element, having a tensioning means for said drive element, wherein said elongate drive element extends around a movable pulley, and said motor, pulley, and tensioning means are mounted on a stay having axial compressive rigidity, the tensioning means comprising:
   means including a segmental cam mounted on said stay for pivotal movement, said cam having a lever end and a cam surface in frictional engagement with a shaft of said pulley;
   a spring mounted on said stay and connected to the lever arm of said cam, wherein said cam surface biases said pulley in a direction for tensioning the drive element;
   said cam biased by said spring constituting a self-locking mechanism by which said cam is moved pivotally by said spring to compensate for any elongation of said drive element, when elongation occurs, and is prevented from moving in the direction of its original position.

2. Drive means as claimed in claim 1, wherein said stay is fixed on both ends to side plates of a machine frame to form a unit framework.

3. Drive means as claimed in claim 1, wherein said drive means is utilized as a drive means for a carriage of a printer.

4. Drive means as defined in claim 1, including a cam shaft mounting said cam pivotally to said stay, said cam being urged by said spring against said shaft of the pulley to develop a reaction force forming an angle $\theta$ with a line connecting said cam shaft and the shaft of the pulley, said self-locking mechanism being formed by the relationship that the $\tan \leq \mu$, where $\mu$ is the coefficient of friction between the cam surface and the shaft of said pulley.

5. Drive means for transmitting a drive force generated by a motor through an elongate drive element, said drive means having a tensioning means for tensing said elongate drive element, wherein said elongate drive element extends around a movable pulley, the tensioning means comprising:
   means including a first member mounted pivotally by a pivot pin and supporting said pulley in a position remote from said pivot pin, and a pivotable second member in the shape of an L-shaped lever having one end movable in frictional engagement with said first member;
   a spring connected to another end of said lever for biasing said one end against said first member, in order to tense said elongate drive element;
   said L-shaped lever biased by said spring constituting a self-locking mechanism by which said first member is moved to compensate for any elongation of said elongate drive element, when elongation occurs, and said second member is prevented from moving in the direction of its original position.

6. Drive means as defined in claim 5, wherein said drive means is utilized as the drive means for a carriage of a printer.

* * * * *